Oct. 22, 1963 J. A. TOURTELLOT 3,108,161

STEREOPHONIC PHONOGRAPH PICKUP

Filed Aug. 6, 1958

INVENTOR.
JOHN H. TOURTELLOT
BY
W. H. Sprouagle
ATTORNEY

United States Patent Office 3,108,161
Patented Oct. 22, 1963

3,108,161
STEREOPHONIC PHONOGRAPH PICKUP

John A. Tourtellot, Merchantville, N.J., assignor to Radio Corporation of America, a corporation of Delaware Filed Aug. 6, 1958, Ser. No. 753,482
8 Claims. (Cl. 179—100.41)

This invention relates to phonograph pickups, and more particularly to phonograph pickups operable to transduce the recordings of a record having two separable recordings in the same record groove.

Phonograph records have heretofore been proposed which have two separate selections, which may be stereophonically related, recorded in the same groove by using vertical undulations for one of the selections and lateral undulations for the other. Alternatively, as described in U.S. Patent 2,114,471, issued to Keller et al., the two recordings may be cut at right angles to each other in the same record groove, with each being at an angle of 45° with respect to the record surface.

Where the two recordings are stereophonically related, it is necessary for stereophonic reproduction that a phonograph pickup be provided which is capable of simultaneously transducing both recordings. As proposed heretofore, such pickups have been relatively bulky in size, and complicated to build and adjust. One reason for this is that two separate transducers and mechanical systems therefor are required which are driven by a common stylus member, thereby necessitating careful design and construction so that minimum cross-talk exists between the separate systems. Furthermore, it is desirable for stereophonic reproduction that the transducing systems have the same frequency response characteristics, or that a predetermined relation should exist between the frequency response characteristics of the two transducing systems. In prior pickups, this required that the transducing elements be carefully aligned with respect to each other and that the mechanical characteristics of the two transducing systems be individually adjusted by damping, or the like, to provide substantially the same overall response.

Accordingly, it is an object of this invention to provide an improved phonograph pickup for records of the type having two separable recordings in the same record groove.

It is a further object of this invention to provide an improved phonograph pickup for stereophonic phonograph records of the type described, which is of simple and inexpensive construction and which can be easily manufactured at low cost using mass production techniques.

Another object of this invention is to provide a simple and inexpensive phonograph pickup including a simplified transducing system eliminating the alignment problem between the two transducing elements which is driven by a common stylus element and provides a pair of output signals corresponding to the two separable recordings in a stereophonic record groove.

In accordance with the invention a single mechanical-to-electrical transducing element such as a piezoelectric crystal is supported in a common mounting structure which clamps and damps the transducing element. The transducing element includes a plurality of electrodes positioned such that stresses applied to the element as a result of stylus motion due to one of the recordings produces an electrical output signal between a first pair of electrodes, and stresses applied to the element as a result of stylus motion caused by the other recording which is conventionally perpendicular to the first recording produces an electrical output signal between a second pair of electrodes.

In the illustrated embodiments of the invention, the transducing element is of the bending type with the major bending surface thereof lying in a plane generally parallel to that of a record, when the stylus is in the record playing position. Vibrations imparted to the stylus arm are transmitted to different portions of the transducing element by a coupling member of suitable configuration. For example, vertical vibrations produce equal in-phase electrical signals from the different pairs of electrodes, whereas lateral vibrations produce equal out-of-phase signals. Vibrations at 45° to the record surface produce an electrical output signal from only one of the pairs of electrodes.

Since the same transducing element is used for both recordings, the mechanical characteristics of the system may be easily adjusted to provide a symmetrical frequency response between the different pairs of electrodes. Furthermore, little cross-talk is produced in the reproduction of a stereophonic record by virtue of the inherent simplicity of construction.

From the foregoing it can be seen that a phonograph pickup for stereophonic records constructed in accordance with the invention requires no more mechanical parts than are required for conventional pickups for use with records having only a single recording in the record groove. Furthermore, a pickup in accordance with the invention is compatible with existing records having a single recording cut with either vertical or lateral undulations.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
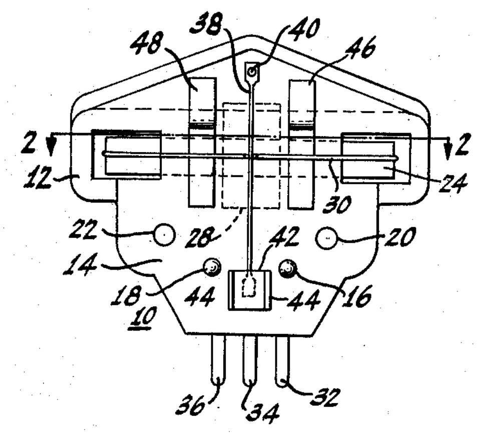
FIGURE 1 is an enlarged bottom view of a phonograph pickup for stereophonic disc records constructed in accordance with the invention.
Figure 4:
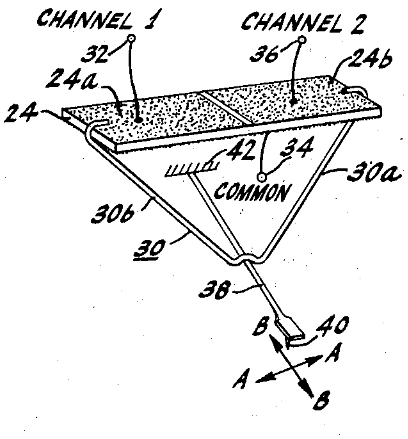
FIGURE 4 is a diagrammatic perspective view of the operating elements of the phonograph pickup shown in FIGURES 1 to 3.
Figure 2:
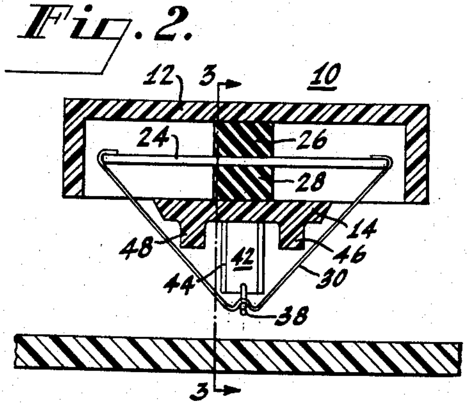
FIGURE 2 is a sectional view taken on the section lines 2—2 of the phonograph pickup shown in FIGURE 1, and shows the stylus element thereof in record playing position on a phonograph record.
Figure 3:
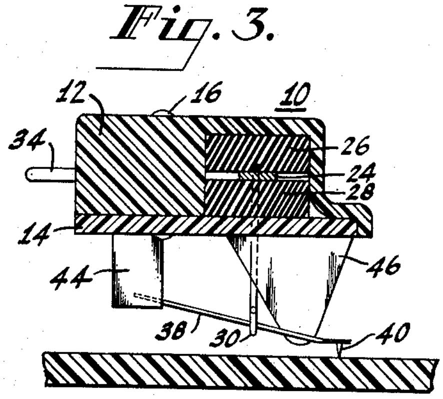
FIGURE 3 is a sectional view taken on the section lines 3—3 of the phonograph pickup shown in FIGURE 2.

Referring now to the drawing wherein like reference numerals will be used to designate the same components throughout, and particularly to FIGURES 1 to 4, a phonograph pickup cartridge 10 constructed in accordance with the invention is adapted to be mounted near the free end of a pivotally movable tone arm, not shown. The pickup cartridge 10 includes a casing comprised of a pair of molded Bakelite top and bottom sections 12 and 14 respectively which are held together by the rivets 16 and 18. The pickup cartridge is adapted to be fastened in the free end of the tone arm by a pair of screws which pass through the holes 20 and 22.

An elongated piezoelectric transducing element 24 of rectangular cross-section is housed within a cavity in the top casing section 12. The transducing element 24 may be a Rochelle Salt crystal or a ceramic crystal of barium strontium titanate or the like. The transducing element 24 has a pair of separated silvered electrodes 24*a* and 24*b* on one surface thereof, and a single common electrode on the opposite surface thereof. If desired, the common electrode may comprise two separate electrodes which are respectively in registry with the electrodes 24*a* and 24*b*. The transducing element 24 is centrally clamped by a pair of damping blocks 26 and 28. The dimensions of the damping blocks 26 and 28 are such that when the casing sections 12 and 14 are forced together by the rivets 16 and 18, sufficient pressure is provided through the damping blocks 26 and 28 to anchor the center of the transducing element 24 securely in position. With the center of the transducing element 24 securely anchored, vibrations transmitted to one end thereof will produce a corresponding electrical output between the electrodes at that end of the pickup. No electrical output will appear between electrodes at the opposite end of the transducing element unless vibrations are simultaneously transmitted thereto.

Since the damping blocks 26 and 28 operate on the same transducing element, the mechanical effects on the separate transducing portions at the opposite ends thereof due to pressure, damping, etc., are substantially the same. For additional damping, auxiliary dampers of Viscoloid or other appropriate viscous damping material may be included in the pickup casing. As is known, the proper combination of the hardness of the damping blocks 26 and 28, and viscosity of the viscous damping, may be used to control high frequency resonances; and also the low frequency compliance and Q, which can be used to control the frequency and resonant rise of mechanical impedance of the pickup and the tone arm system.

The transducing element is positioned so that the longitudinal axis thereof lies in a plane generally parallel to the plane of a record, when the pickup is in the record playing position. The transducing element 24 is arranged and polarized to produce an output voltage in response to a bending stress when driven by a yoke member 30 which is formed of a single piece of material such as piano wire to have a pair of divergent legs 30*a* and 30*b* and a reentrant central portion. The wire is of a dimension to be stiff axially, but flexible in all directions perpendicular to the axis thereof. The ends of the divergent legs of the yoke member 30 are bent over and are cemented or otherwise affixed to the respective ends of the transducing element 24. Vibrations imparted to the yoke member 30 which are parallel to the axis of one of its legs will be readily transmitted through that leg to the end of the transducer 24 to which it is attached. At the same time the other leg will flex and transmit substantially none of the vibrations to the opposite end of the transducer.

Electrical connections are provided for the transducing element 24 by flexible conductors (not shown) which are connected between the various electrodes of this element, and the terminals 32, 34 and 36. One of these terminals such as the terminal 34 may serve as a common terminal for the piezoelectric element and is connected to the common electrode of the transducer, and the terminals 32 and 36 are connected to the electrodes 24*a* and 24*b* respectively. Connections from the terminals 32, 34 and 36 to the phonograph amplifier may be made in the usual manner by conductors extending along the tone arm. Thus, electrical signals corresponding to one of the separable recordings may be derived from the terminals 32 and 34, and electrical signals corresponding to the other recording may be derived from the terminals 34 and 36.

The stylus assembly for the pickup cartridge includes a stylus arm 38 one end of which is flattened to support a stylus 40. By way of example, the stylus 40 may have a 1 mil. radius tip for use with conventional 45 r.p.m. and 33⅓ r.p.m. records. The opposite end of the stylus arm 38 is also flattened, and is inserted into a block 42 of resilient material which is held in a housing 44 on the bottom casing section 14. The block 42 of resilient material provides damping of the stylus arm 38 and additionally protects the yoke and transducer from damage due to excessive pressure applied to the stylus 40. The mounting of the rear of the stylus in a rubber-like resilient material can be used to control high frequency resonances between stylus, mounting and record.

Since the stylus arm extends below the pickup casing, a pair of downwardly extending protective side walls 46 and 48 are provided as integral portions of the bottom casing section 14. The side walls extend on either side of the stylus arm 38, and guard the mechanical system of the pickup against damage if the tone arm is inadvertently dropped on the record or the like.

This pickup and the pickup shown in FIGURES 1 to 4 are primarily designed for use with vertical-lateral or 45—45 type stereophonic phonograph records. For example, in a 45—45 type record the channel 2 recording would be cut in the direction as indicated by the arrows A—A (FIGURE 4), and the channel 1 recording in the direction indicated by the arrows B—B. In other words, the channel 2 recording may be considered to modulate one wall of the record groove, and the channel 1 recording to modulate the other groove wall. The stylus 40, in following the undulations (i.e., tracking) of a groove having only the channel 2 recording would move back and forth generally in a line coincident with the axis of the leg 30*a*, which is affixed to the right hand end of the transducing element 24. Since the leg 30*a* is stiff axially, these vibrations will be directed through the stylus arm 38 and the leg 30*a* to the right hand end of the transducing element 24, causing this end of the transducing element to bend. At the same time, this motion is generally in a plane perpendicular to the axis of the leg 30*b* of the yoke member 30, which is affixed to the left hand end of the transducing element 24. Since the leg 30*b* is flexible in all directions perpendicular to the axis thereof as mentioned above, the leg 30*b* flexes back and forth with the motion of the stylus arm 38 and causes substantially no bending of the left hand end of the transducing element 24.

The same action occurs for a channel 1 recording cut at an angle indicated by the arrows B—B except that the vibrations are readily transmitted to the left hand end of the transducing element 24 causing it to bend with negligible effect on the right hand end thereof. With recordings in both channels, the movement of the stylus arm 38 is complex, causing motion which has components that cause bending of both ends of the transducing elements 24. For example, if the record groove undulations are vertically disposed, the net effect will be to move the stylus arm 38 up and down in a vertical plane. This produces equal axial components of motion which are directed along the legs 30*a* and 30*b* of the yoke member so that both ends of the transducer 24 bend equally, and accordingly corresponding in-phase signals of equal amplitude will be derived from the terminals 32 and 36 with respect to the terminal 34.

If the record groove undulations are lateral, then the stylus arm 38 will move laterally. This produces equal and opposite components in the legs 30*a* and 30*b* causing one end of the transducing element 24 to bend up as the other end bends down. Accordingly, equal signals 180° out-of-phase will be derived from the terminals 32 and 36 with respect to the terminal 34. Although the transducing element 30 has been shown and described as responsive to bending forces to produce an electrical output signal, it will be appreciated by those skilled in the art that other types of transducers, such as one responsive to twisting, may also be used without departing from the scope of the invention.

If desired, the yoke member 30 of the pickup shown in FIGURES 1 to 4 may be of relatively inflexible construction. With a substantially inflexible yoke member 30, vertical vibration of the stylus arm 38 forces each of the legs of the yoke member 30 up and down thereby causing corresponding bending of either end of the transducing element 24 which is centrally anchored. For lateral motion of the stylus arm 38 one leg of the yoke member 30 will be under compression while the other is under tension causing one end of the transducing element to be bent upwardly while the other is bent downwardly. For motion along the 45° axis corresponding to axis A—A, the force produced by the stylus arm 38 can be divided into a pair of equal components: the vertical component; and the lateral component. The vertical component produces like vertically directed forces at both ends of the transducing element 24. The lateral component produces a downwardly directed force at one end of the transducing element and an upwardly directed force at the other end. Since the dimension between the reentrant portion of the yoke member and the transducing element is equal to half the length of the transducing element, the geometry of the driving structure is such that the components of force due to the vertical and lateral vibrations will be in opposite directions and will cancel out causing no bending at the left hand end of transducing element 24. However, at the right had end of the transducing element 24, these forces will add to produce bending and the generation of a corresponding electrical signal between the common electrode and the electrode 24*b*. In like manner vibrations along the axis B—B only produces bending of the left hand end of the transducing element 24 which results in the production of a corresponding electrical signal between the common electrode and the electrode 24*a*.

Figure 5:
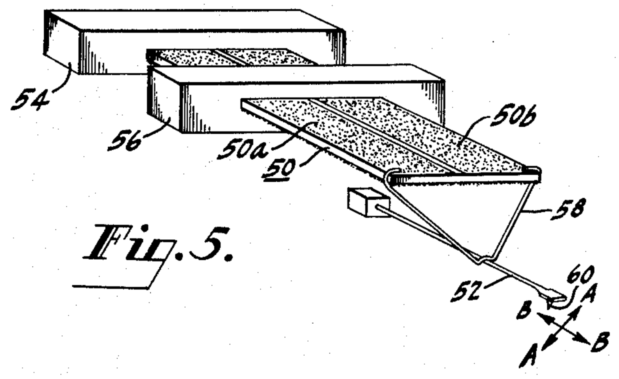
FIGURE 5 is a diagrammatic perspective view of the operating elements of a phonograph pickup illustrating an embodiment of the invention.

In the embodiment of the invention shown in FIGURE 5, only the operating elements of the pickup are shown. The pickup casing, which has not been shown for the purpose of simplification, may be of any suitable configuration and construction. The pickup of FIGURE 5 includes a transducing element 50 of rectangular configuration which has its longitudinal axis disposed generally parallel to the axis of a stylus element 52. The transducing element includes a pair of separate silvered electrodes 50*a* and 50*b* which extend along the length of the pickup on one side thereof, and a common electrode disposed over the entire opposite surface. As mentioned above, the common electrode may be subdivided into two electrodes in registry with the electrodes 50*a* and 50*b*.

One end of the transducing element 50 is clamped in resilient anchoring blocks 54 and 56 which are adapted to be maintained under pressure in the pickup casing. The free end of the transducing element 50 supports a yoke member 58 which is generally of the same configuration as that shown in FIGURES 1 to 4. The yoke member in turn is in engagement with and is driven by cantilever arm 52 which has one end thereof anchored at a point on the pickup casing and carries a stylus element 60 at the free end thereof.

Figure 6:
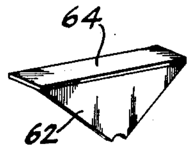
FIGURE 6 is a perspective view of a modification of the coupling member which transmits vibrations from the stylus assembly to the transducing elements.

The transducing element 50 may be considered as pivoting about the longitudinal axis thereof. Accordingly, if the yoke member 58 is relatively stiff, the forces applied to the pickup along the 45° axis A—A balance out on the other 45° axis B—B as explained above. Since the operation of the pickup is not dependent upon the flexibility of the legs of the yoke member 58, the yoke member 62 of the configuration shown in FIGURE 6 may be used. The yoke member of FIGURE 6 may be made of sheet metal or of a compliant material such as Viscoloid. A flange 64 is provided along the upper portion thereof which is adapted to engage and be cemented or otherwise affixed to the free end of the transducer 50 of FIGURE 5. The yoke member 62 also includes a notch at the lower apex thereof for receiving the cantilever stylus arm 52 of FIGURE 5. Preferably the vertical dimension of the yoke member 62 is about half the width of the transducing element 50 to provide the desired geometry for the cancellation of the respective forces during reproduction of only one of the two separable recordings as explained above.

The pickup described is operable for use with records wherein one of the two separable recordings is cut with vertical undulations, and the other with lateral undulations. In such a case however, a suitable conversion network of the type described in the aforementioned Keller et al. patent must be connected to the terminals 32, 34 and 36 to derive the separate signals corresponding to the separate recordings.

From the foregoing it will be understood that the pickup described is also compatible with presently existing laterally cut and vertically cut records having only a single recording in the second groove, since either lateral or vertical movement of the stylus element produces a response in both ends of the transducing element. As mentioned above, for vertical stylus movement the two output signals from the transducing element are in phase, and for lateral stylus movement the two output signals from the transducing element are of opposite phase. Thus, by proper connection to the terminals 32, 34 and 36 either vertically or laterally cut single channel records may be reproduced.

The physical size of a pickup cartridge constructed in accordance with the invention is essentially the same as that of presently existing cartridges for single channel records. It can be seen from the foregoing description that the stereophonic phonograph pickup of the invention requires no more physical parts than a conventional pickup. Since the same transducing element is used for reproducing both channels, the frequency response characteristics of both transducing system is substantially symmetrical without the necessity of tedious compensation procedures to balance these systems. Furthermore, the inherent simplicity of the driving structure comprising the yoke which interconnects the two ends of the transducing element greatly reduces the problems attendant with minimizing cross-talk between the reproduced signals. By using only a single transducing element the problem of positioning and mounting the driving yoke and transducer for optimum performance characteristic is greatly simplified.

What is claimed is:

1. A stereophonic phonograph pickup comprising, an elongated mechanical-to-electrical piezoelectric transducing element having a pair of separate electrodes disposed on one surface at opposite ends thereof, means for anchoring said piezoelectric element at the center thereof, and a driving yoke for said transducing element having a pair of divergent vibration transmitting portions the axes of which intersect and the free ends of which are respectively connected to opposite ends of said transducing element.

2. A stereophonic phonograph pickup comprising, an elongated mechanical-to-electrical piezoelectric transducing element having a pair of separate electrodes disposed on one surface at opposite ends thereof and a common electrode in registry with said pair of electrodes on the opposite surface of said transducing element, means providing electrical connections to said electrodes, means for anchoring said piezoelectric element at the center thereof, and a driving yoke for said transducing element having a pair of divergent vibration transmitting portions the axes of which intersect at substantially right angles and the free ends of which are respectively connected to opposite ends of said transducing element.

3. A stereophonic phonograph pickup comprising, an elongated mechanical-to-electrical piezoelectric transducing element having a pair of separate electrodes disposed on one surface and extending along the length thereof, means for anchoring said piezoelectric element at one end thereof, a driving yoke means for attaching said yoke to the free end of said transducing element such that the driving yoke and the free end of said transducing element define an isosceles triangle, and stylus means coupled to said driving yoke at a point corresponding to the vertex of the triangle defined by said yoke and said transducing element for transmitting vibrations independently to either side of said transducing element.

4. A stereophonic phonograph pickup comprising, an elongated mechanical-to-electrical piezoelectric transducing element having a pair of separate electrodes disposed on one surface and extending along the length thereof and a common electrode in registry with said pair of electrodes on the opposite surface of said transducing element, means providing electrical connections to said electrodes, means for anchoring said piezoelectric element at one end thereof, a driving yoke attached to the free end of said transducing element such that the driving yoke and the free end of said transducing element define an isosceles triangle, and stylus means coupled to said driving yoke at a point corresponding to the vertex of the triangle defined by said yoke and said transducing element for transmitting vibrations independently to either side of said transducing element.

5. A phonograph pickup for use with records of the type having a pair of stereophonically related recordings in the record groove thereof comprising in combination, an elongated piezoelectric transducer of rectangular cross-section having at least a pair of conductive electrodes disposed on one surface of said transducer adjacent different edges thereof, electrode means disposed on the opposite surface of said transducer in cooperative registration with said pair of electrodes, means for mounting said transducer to permit generation of electrical signals between each of said pair of electrodes and said electrode means in response to stresses applied to said different edges, a yoke member having portions connected with said different edges for transmitting vibrations thereto, and stylus means adapted to track a record groove coupled with said yoke member.

6. A stereophonic phonograph pickup comprising, means providing a single mechanical-to-electrical piezoelectric transducing element having at least three electrodes, means providing a stylus member adapted to track the groove of a stereophonic disc phonograph record, and means comprising a yoke member connected to at least two points of said transducing element adjacent first and second pairs of said electrodes respectively and to said stylus member for coupling said stylus member to said transducing element so that vibrations in a first direction stress only a first portion of said transducing element to produce corresponding electrical output signals from only a first pair of said plurality of electrodes and vibrations in a second direction stress only a second portion of said transducing element to produce corresponding electrical output signals from only a second pair of said plurality of electrodes.

7. A phonograph pickup for use with records of the type having a pair of stereophonically related recordings in the record groove thereof with each recording comprising undulations in a different wall of said groove, comprising in combination, an elongated piezoelectric transducer of rectangular cross-section having at least a pair of conductive electrodes disposed on one surface of said transducer adjacent different edges thereof, electrode means disposed on the opposite surface of said transducer in cooperative registration with said pair of electrodes, means for mounting said transducer to permit generation of electrical signals between each of said pair of electrodes and said electrode means in response to stresses applied to said different edges, a yoke member having a pair of legs connected with said different edges for transmitting vibrations thereto, each of said legs disposed in substantially perpendicular relation to one of the walls of said groove, and stylus means adapted to track a record groove coupled with said yoke member.

8. A stereophonic phonograph pickup comprising, an elongated mechanical-to-electrical piezoelectric transducing element having a pair of separate electrodes disposed on one surface and extending along the length thereof and a common electrode in registry with said pair of electrodes on the opposite surface of said transducing element, means providing electrical connections to said electrodes, means for anchoring said piezoelectric element at one end thereof, and a driving yoke attached to the free end of said transducing element for transmitting vibrations independently to either side of said transducing element, said driving yoke comprising a triangular member having its base attached to said transducing element and having a vertical dimension which is on the order of half its base dimension.

References Cited in the file of this patent

UNITED STATES PATENTS

| | | |
|---|---|---|
| 1,906,214 | Nicolson | Apr. 25, 1933 |
| 2,328,478 | Mason | Aug. 31, 1943 |
| 2,769,867 | Crownover et al. | Nov. 6, 1956 |
| 2,944,117 | Gray | July 5, 1960 |
| 2,944,118 | Gray | July 5, 1960 |
| 2,955,216 | Dieter | Oct. 4, 1960 |

FOREIGN PATENTS

| | | |
|---|---|---|
| 1,119,241 | France | June 18, 1956 |
| 1,000,608 | Germany | Jan. 10, 1957 |
| 1,029,172 | Germany | Apr. 30, 1958 |